United States Patent Office.

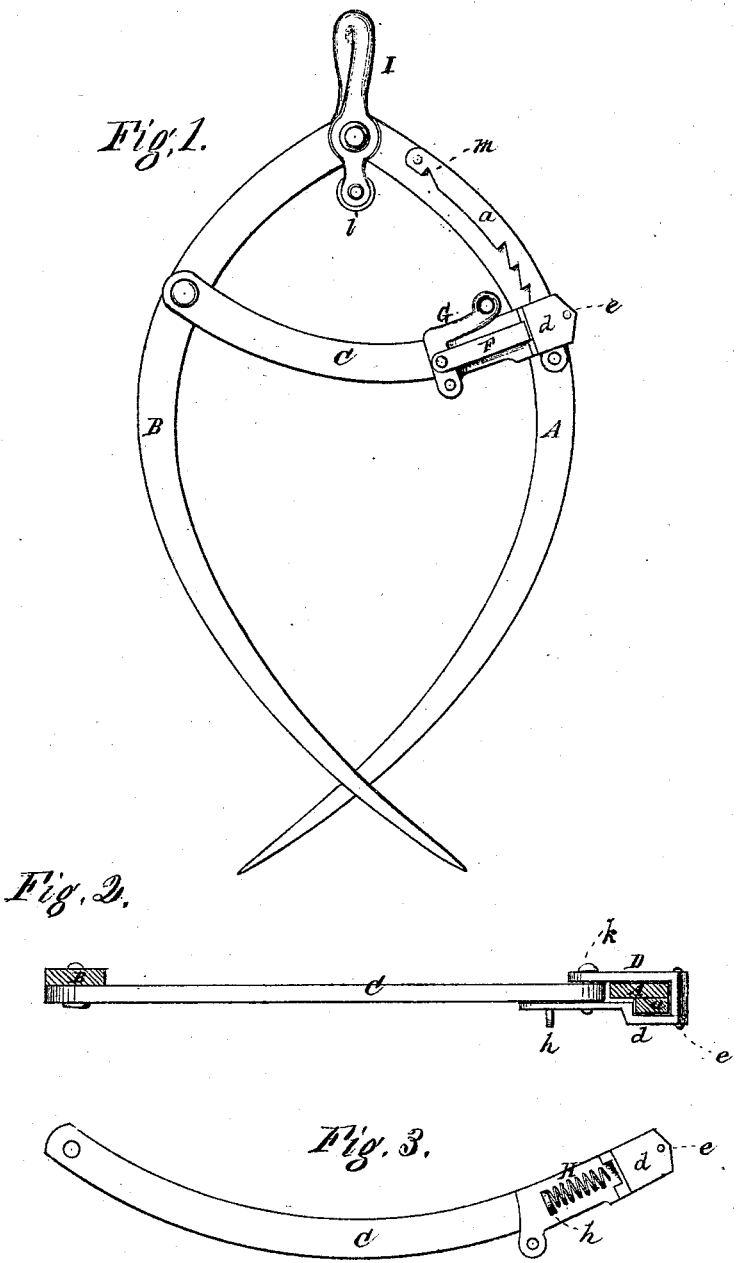

WILLIAM E. DERRICK, OF JORDAN, NEW YORK, ASSIGNOR TO HIMSELF AND GEORGE B. GARRISON, OF SAME PLACE.

Letters Patent No. 104,124, dated June 14, 1870.

IMPROVEMENT IN HORSE HAY-FORKS.

The Schedule referred to in these Letters Patent and making part of the same.

To all whom it may concern:

Be it known that I, WILLIAM E. DERRICK, of Jordan, in the county of Onondaga and State of New York, have invented a new and useful Improvement in Horse Hay-Forks; and I do hereby declare that the following is a full, clear, and exact description thereof, which will enable those skilled in the art to make and use the same, reference being had to the accompanying drawing forming part of this specification, in which—

Figure 1 is a front view of my invention, and
Figures 2, 3, and 4, are detail views.

Similar letters of reference indicate like parts in the several figures.

This invention relates to that class of horse hay-fork known as the caliper-fork; and consists in certain improvements, whereby a very simple, strong, and easily-operated implement is obtained, as hereinafter explained.

In the accompanying drawing—
A B are the tines.

C is a swinging bar, that is pivoted to the tine B at one end, and its opposite end has a head or box, D, that slides vertically on the tine A, to open and close the fork.

To give the bar C a greater sliding movement on the tine A, I make the head or box D in a separate piece, and pivot it to the end of the bar C by a pivot, $k$, fig. 2. This allows the box to follow the direction of the tine A, while the arm C is left free to greatly change its angle with relation to the said tine A; and by this means the arm C has a greater sliding range, and the fork can be opened wider and works more free and smooth than when the head D is fixed rigidly on the end of the bar C.

To save labor in constructing the head D, I cast it in two pieces, D $d$, fig. 2, and rivet them to each other by the rivets $e$ and $k$.

The lock is made by providing the tine A with a toothed rack, $a$, which I make separately and rivet to the tine of the fork, as shown in fig. 1.

To the rear end of the box or plate $d$ I pivot an elbow-lever, G, and, by means of a tripping-line, the elbow-lever G is made to operate a sliding bolt or detent, F, one end of the said detent being pivoted to the elbow-lever G, and its opposite end passing into and through the box D $d$, engages with the toothed rack $a$, that is carried by the tine A.

The inner side of the detent F has a recess or cavity, $f$, fig. 4, in which lies a spiral spring, H, fig. 3, to actuate and hold the detent engaged with the rack $a$.

This spring H has for its fulcrum a stud, $h$, figs. 2 and 3, that projects from the plate $d$.

The upper end of the rack $a$ has a notch, $m$, fig. 1, that assists in holding the fork open, but it allows the fork to close under a moderate pressure, without having to push the bar C down by hand. In pushing the fork into the hay, it closes and locks itself, and the swing-bar C requires no care or pushing down, but takes care of itself, the box D $d$ sliding down on the tine A as the fork is closed; and, as soon as the lever G is acted upon by the tripping-line, the weight of the hay opens the fork and throws up the lever C.

The hoisting-eye or loop I is extended downward below the main pivot, so as to hang a small pulley, $i$, for the tipping-line to run in.

This fork has been used practically, and works well, the locking and tripping devices working freely and always the same, without any binding or cramping action when the fork is heavily loaded, and, as a whole, makes a very substantial, simple, and desirable fork.

Having thus described my invention,
What I claim as new, and desire to secure by Letters Patent, is—

1. The combination of the curved tines A B, swinging bar C, and head or box D, said box being pivoted or flexibly secured to the bar C, substantially as and for the purpose herein described.

2. The tines A B, swinging bar C, and lock G F H $a$, all arranged and operating as herein shown, and for the purpose specified.

The above specification of my invention signed by me this 30th day of March, 1870.

WILLIAM E. DERRICK.

Witnesses:
WM. DUNCAN,
F. A. MORLEY.